United States Patent [19]
Kobos et al.

[11] Patent Number: 5,882,739
[45] Date of Patent: Mar. 16, 1999

[54] METHODS FOR IMPROVED DRYING PERFORMANCE OF A DISHWASHER AND RESULTING PRODUCTS THEREOF

[75] Inventors: Duane M. Kobos, LaPorte, Ind.; Patrick J. MCCann, St Joseph, Mich.

[73] Assignee: Whirlpool Corporation, Benton Harbor, Mich.

[21] Appl. No.: 822,345

[22] Filed: Mar. 20, 1997

Related U.S. Application Data

[60] Provisional application No. 60/016,499 Apr. 30, 1996.
[51] Int. Cl.$^6$ ........................................................ B05D 3/06
[52] U.S. Cl. ............................ 427/536; 134/201; 264/83; 264/455; 264/469; 264/483
[58] Field of Search ................................. 216/58; 264/83, 264/455, 469, 483; 427/237, 536; 134/201

[56] References Cited

U.S. PATENT DOCUMENTS

| | | |
|---|---|---|
| 2,400,720 | 5/1946 | Staudinger et al. . |
| 2,786,780 | 3/1957 | Walles et al. . |
| 2,786,783 | 3/1957 | Hahn et al. . |
| 2,832,697 | 4/1958 | Walles . |
| 2,832,698 | 4/1958 | Walles . |
| 2,832,699 | 4/1958 | Walles . |
| 2,858,237 | 10/1958 | Walles et al. . |
| 2,937,066 | 5/1960 | Walles . |
| 3,588,213 | 6/1971 | Braga et al. ........................... 34/234 X |
| 3,625,751 | 12/1971 | Walles . |
| 3,684,554 | 8/1972 | Donald et al. . |
| 3,740,258 | 6/1973 | Walles .................................. 206/84 X |
| 3,959,561 | 5/1976 | Walles .................................... 438/412 |
| 4,184,500 | 1/1980 | Herbst .................................... 134/114 |
| 4,214,014 | 7/1980 | Höfer et al. .............................. 427/40 |
| 4,425,210 | 1/1984 | Fazlin .................................. 204/298 X |
| 4,709,488 | 12/1987 | Anselmino et al. ...................... 34/235 |
| 4,861,250 | 8/1989 | Walles et al. ............................. 425/90 |
| 5,098,608 | 3/1992 | Zelez ..................................... 264/83 X |
| 5,156,783 | 10/1992 | Seizert et al. ............................ 264/83 |
| 5,173,146 | 12/1992 | Ito et al. ............................... 427/10 X |
| 5,213,222 | 5/1993 | Iwasaki et al. ........................... 264/460 |
| 5,344,462 | 9/1994 | Paskalov et al. ...................... 8/115.52 |
| 5,456,972 | 10/1995 | Roth et al. ........................... 264/483 X |
| 5,560,963 | 10/1996 | Tisack .................................. 264/83 X |

*Primary Examiner*—Michael Lusignan
*Attorney, Agent, or Firm*—Hill & Simpson

[57] ABSTRACT

The present invention provides a method for improving the drying performance of a dishwasher and the resulting products thereof. The method involves chemically treating a dishwasher component to alter or modify the chemical properties of the surface, rendering such surface hydrophilic. The hydrophilic surface sufficiently attracts water molecules within the dishwasher to enhance the drying capabilities of the dishwasher.

9 Claims, 3 Drawing Sheets

U.S. Patent    Mar. 16, 1999    Sheet 1 of 3    5,882,739
FIG. 1
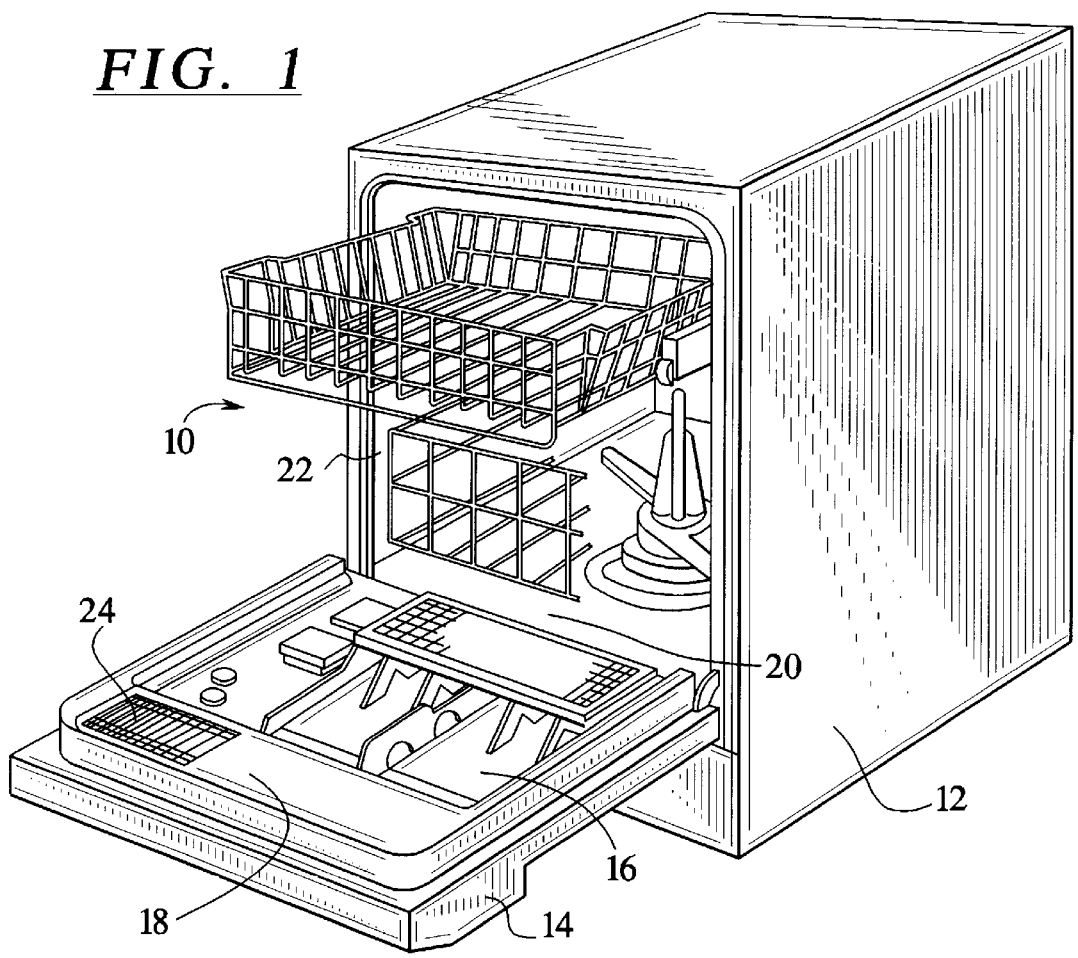
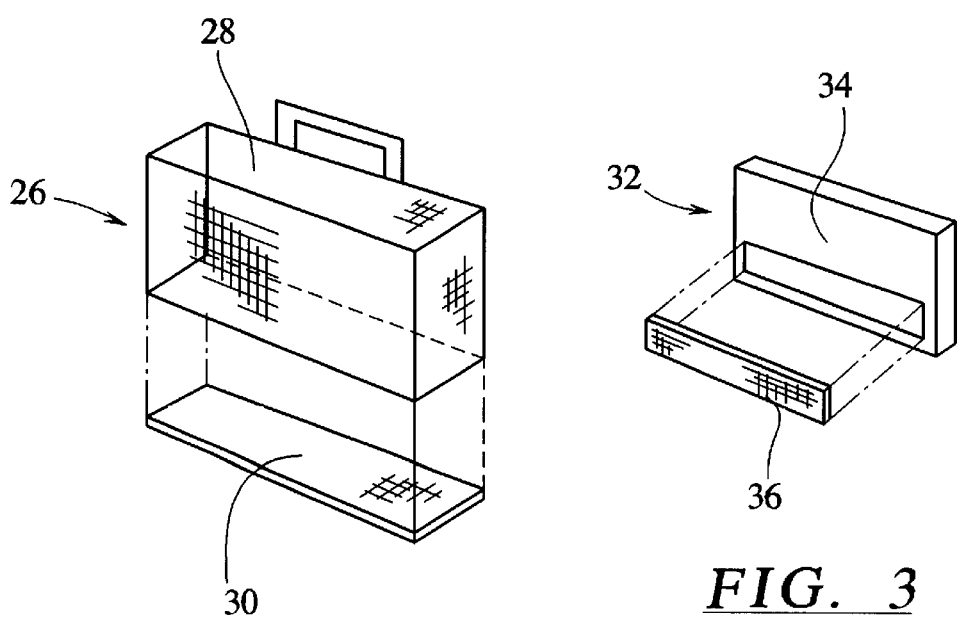
FIG. 2
FIG. 3

METHODS FOR IMPROVED DRYING PERFORMANCE OF A DISHWASHER AND RESULTING PRODUCTS THEREOF This application claims the benefit of U.S. Povisional Application No.: 60/016,499 filed Apr. 30, 1996

BACKGROUND OF THE INVENTION

The present invention relates generally to dishwashers. More specifically, the present invention relates to methods and products designed to improve the drying performance of a dishwasher.

Designers and manufacturers of dishwasher systems have used several methods to improve dish drying, cutlery drying and drying of the internal walls of a dishwasher chamber. One known method is to design dishwasher systems with compartments for adding rinse agents to the final fill of washing water. The rinse agent is formulated with surfacting chemistry that alters the water-to-surface interaction. The result is that this conditioned water more effectively "wets" the surfaces of dishes and interior surfaces, forms thinner films and droplets that promote drying, and also drains better from the surfaces.

Another method is to raise the surface energy of polymeric interior surfaces by using a flame treatment process. Application of a flame to a polymeric surface oxidizes the surface and makes water molecules more attractive to that surface.

While these methods may have been utilized to promote drying, inherent problems exist with both of these methods. An apparent problem with the first method is the need to use a rinse agent and the extra effort involved with same. Many dishwasher customers simply do not use rinse agents due to, for example, cost or reported allergic reactions. With respect to the second method, flame treatment is difficult to use with small polymeric structures. The structures easily become overheated by the flame and they warp, char or melt.

Therefore, a need exists for an improved method designed to enhance the drying performance of a dishwasher. Preferably, the method can be utilized on various dishwasher components, whether large or small in form.

SUMMARY OF THE INVENTION

The present invention provides an improved method for enhancing drying performance of a dishwasher and products having such enhanced performance. Pursuant to the present invention, a chemical treatment is utilized to alter the polymeric surface of a dishwasher component. The chemical treatment changes the chemical properties of the surface by rendering the surface functionally polar, thereby enhancing the hydrophilic properties of the surface. The hydrophilic surface is more attractive to the water molecules inside the dishwasher, relative to the force of attraction from adjacent water molecules. This water attractive nature of the surfaces promotes the drying performance of the dishwasher.

In this regard, the present invention provides a method for improving drying performance of a dishwasher. The method includes the step of chemically treating a dishwasher component to render at least one surface hydrophilic. Among other examples, suitable examples of chemical treatments that may be used pursuant to the present invention are a sulfonation treatment or a gas plasma treatment.

A variety of dishwasher components may be treated to improve the drying performance of a dishwasher. For example, a screen vent, a silverware basket, a dishwasher tub and a door lining are suitable dishwasher components that may be treated pursuant to the present invention.

The present invention also provides an apparatus with improved drying capabilities. The apparatus includes a dishwasher having a plurality of dishwasher components. Uniquely however, at least one of the dishwasher components has a functionally polar surface capable of attracting water. The resulting hydrophilic surface on the dishwasher component is obtained by chemically treating the dishwasher component to alter the chemical properties of the surface to functionally polar. As noted above, suitable chemical treatments are a sulfonation treatment or a gas plasma treatment.

Still further, the present invention provides a method for making a dishwasher component with enhanced drying performance. Initially, a dishwasher component is created by molding polymeric materials. Then, the formed dishwasher component is chemically treated to render at least one surface hydrophilic.

An advantage of the present invention is that it provides a method for improved drying performance of the dishwasher that virtually eliminates the need for a rinse agent.

Another advantage of the present invention is that it provides a dishwasher with improved drying capabilities.

Yet another advantage of the present invention is that is improves the drying performance of a dishwasher by modifying the surface properties of dishwasher components while preserving the physical condition and bulk properties of the components.

Additional features and advantages of the present invention are described in, and will be apparent from, the detailed description of the presently preferred embodiments as well as the drawings.

BRIEF DESCRIPTION OF THE DRAWINGS

FIG. 1 is a perspective view of an automatic dishwasher wherein at least some of the surfaces of the dishwasher components have been chemically treated to improve the drying performance of the dishwasher.

FIG. 2 is a perspective view of a multi-piece silverware basket of the present invention having an untreated and a chemically treated portion.

FIG. 3 is a perspective view of a multi-piece screen vent of the present invention having an untreated and a chemically treated portion.

DESCRIPTION OF THE PREFERRED EMBODIMENTS

Figure 4:
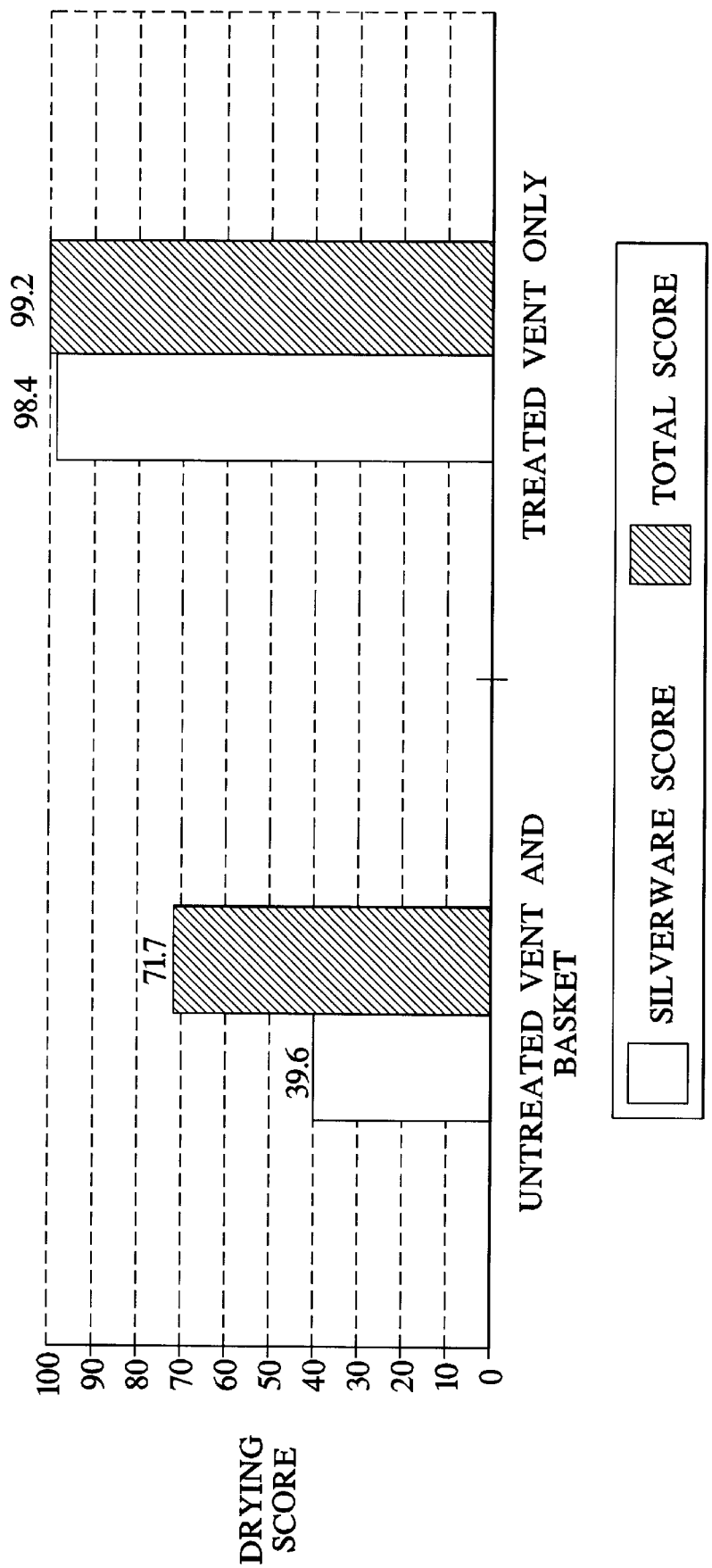
FIG. 4 graphically illustrates the drying performance results obtained from comparative testing conducted on dishwasher components treated with a sulfonation treatment.

The present invention provides treatment methods and products designed to improve the drying performance of a dishwasher. Suitable treatment methods are utilized to alter the chemical properties of at least one surface of a dishwasher component to render such surface functionally polar. As a result, the resulting surface exhibits hydrophilic properties.

To this end, the method of the present invention includes chemically treating a dishwasher component to render at least one surface hydrophilic. A variety of chemical treatments can be utilized pursuant to the present invention. In essence, any chemical treatment method that can produce polar chemical functional groups on the polymeric surface of a dishwasher component will effectively render that surface functionally polar and can be utilized. Examples of such polar chemical functional groups include carbonyl, carboxyl, hydroperoxide, hydroxyl, ether, ester, and sulfonic acid groups.

An example of a chemical treatment method that may be utilized pursuant to the present invention is a sulfonation process. The process of sulfonating surfaces is known in the art. For instance, suitable sulfonation processes that can be utilized pursuant to the present invention are detailed in U.S. Pat. Nos. 3,740,258 and 3,959,561, the disclosures of which are incorporated herein by reference.

Such sulfonation processes, as set forth in these patents, chemically attach polar chemical groups to a polymeric surface. This causes the treated surface to strongly attract water molecules. Specifically, as noted in U.S. Pat. No. 3,959,561, the sulfonation treatment chemically attaches a plurality of neutralized sulfonic acid groups to the carbon atoms of the polymer. These neutralized sulfonic acid groups absorb and retain water molecules by coordinate bonding so that water is chemically retained.

In a preferred embodiment, a chemical treatment that may be used pursuant to the present invention is a gas plasma treatment. Such a gas plasma treatment is less costly and relatively safer to operate. Moreover, unlike the sulfonation treatment, it does not visibly discolor the surface of the dishwasher component during treatment. The gas plasma process is used to alter interior surfaces and thus favorably change the water-to-surface interaction. The general process of gas plasma treatment is known in the art. See, for example, U.S. Pat. No. 4,425,210, the disclosure of which is incorporated herein by reference.

The gas plasma process involves exposing the surface of a dishwasher component to a near-vacuum that contains a trace amount of a process gas. To this end, the gas plasma process requires a plasma chamber, a vacuum pump, a source of energy, and metered gases. For treatment, the dishwasher component is initially placed in a plasma chamber. The polymeric dishwasher component is then exposed to low temperature gas plasma in the chamber at a suitable pressure and for a suitable treatment time. Such conditions would readily be known to those skilled in the art.

Suitable gases that may be used for the gas plasma treatment are oxygen, nitrogen, argon, carbon tetrafluoride or mixtures thereof. In a preferred embodiment, oxygen gas plasma is utilized to treat the dishwasher components. The gas is converted to a plasma state by the application of energy, typically radiation in the form of radio frequency (RF) or microwaves.

The action of this plasma process changes the chemistry of the component surface to render the surface hydrophilic (functionally polar). The low temperature plasma process utilized in the present invention effectively enhances the hydrophilic properties of the polymeric surface without changing the bulk properties of the polymeric material. Unlike other processes (i.e. flame treatment), low pressure gas plasma does not significantly raise the temperature of the treated material, thereby preserving the physical condition and properties of the material.

The functionally polar surface obtained from the chemical treatment is attractive to polar water molecules. Thus, surfaces previously non-polar in nature, on which water droplets would normally bead-up, can be made to appear polar as a result of the chemical treatment utilized pursuant to the present invention. A water droplet in contact with such a treated surface will no longer bead up as compared to an untreated surface. The resulting surface thus exhibits hydrophilic properties.

By way of example and not limitation, examples setting forth suitable chemical treatments that may be utilized pursuant to the present invention will now be given.

CHEMICAL TREATMENT EXAMPLE NO. 1

In an embodiment, dishwasher components can be treated with a sulfonation treatment. As noted above, sulfonation treatments are generally known in the art.

Pursuant to the present invention, a screen vent for a dishwasher was treated using a gaseous sulfur trioxide treatment method. The treatment was conducted in accordance with the procedure and ranges outlined in U.S. Pat. No. 3,959,561, col. 3, lines 12–15, using a sulfur trioxide in dry air mixture. After the initial sulfonating step, the screen vent was then neutralized. The neutralization process was conducted in accordance with the process outlined in U.S. Pat. No. 3,959,561.

In addition, a post-neutralization bleaching process was performed on the vent arrangement to whiten the color of the component. The bleaching process was conducted in accordance with the procedure as outlined in U.S. Pat. No. 3,740,258, col. 4, lines 7–12.

CHEMICAL TREATMENT EXAMPLE NO. 2

In another embodiment, dishwasher components can be treated with a gas plasma treatment. Similar to the sulfonation method, gas plasma treatments are generally known in the art.

Pursuant to the present invention, the gas plasma treatment process was as follows. The individual dishwasher components, namely the screen vent and silverware basket, were placed in a suitable gas plasma chamber. The dishwasher components were then exposed for 15 minutes to oxygen gas plasma. The oxygen gas plasma was generated by 2,000 watts of 40 kHz radio frequency energy in a 250 mTorr vacuum.

The present invention also provides a method of making a dishwasher component with enhanced drying capabilities. Initially, suitable polymeric materials are molded to form the dishwasher component. As one skilled in the art appreciates, a variety of molding techniques can be utilized to make the dishwasher components. For example, the following molding processes can be utilized: injection molding; extrusion molding; blow molding; rotational molding; and the like. In a preferred embodiment, the dishwasher component is made by an injection molding process.

As one skilled in the art further appreciates, a variety of polymeric materials can be utilized in the present invention. Suitable polymeric materials that can be molded and subsequently treated are homopolymers of ethylene, propylene, isobutylene, methyl-pentene-1, butene-1, vinyl chloride, vinylidene chloride, polyoxymethylene, polyphenylene oxide, polyphenylene sulfide, polyamides, acrylonitriles, interpolymers of the foregoing monomers and copolymers. The following polymeric materials are preferred: high and low density polyethylene; polypropylene; ethylene/propylene copolymers; ethylene/butene-1 copolymers and blends thereof.

After the polymeric material is molded into a dishwasher component, the chemical treatment of the present invention is then utilized to treat the dishwasher component. For example, a screen vent arrangement, a silverware basket, a dishwasher tub and a door lining are suitable dishwasher components that may be chemically treated with the present invention. Preferably, a screen vent arrangement and a silverware basket are treated pursuant to the present invention. Naturally, limiting the number of dishwasher components that are treated with the present invention lowers the cost of the resulting treatment. On the other hand, increasing the number of dishwasher components that are treated will likewise increase the drying capabilities of the resulting dishwasher.

FIG. 1 illustrates a dishwasher having a plurality of dishwasher components wherein at least some are chemically treated pursuant to the present invention. Specifically, FIG. 1 illustrates a dishwasher 10 having a cabinet 12 and a door 14. The interior of the door 14 holds a removable silverware basket 16 and has an internal plastic lining 18. The door 14 also contains a screen vent 24 assembled into the door 14. A wash chamber 20 is surrounded with a dishwasher tub 22. The chemical treatment process of the present invention may be utilized to treat components, such as the screen vent 24, the door lining 18, the removable silverware basket 16, and the dishwasher tub 20. Applying the chemical treatment of the present invention to at least one surface of these various components reduces the size and amount of water droplets that remain on such surfaces after the completion of the dish washing cycle, improving the drying performance of the dishwasher.

As noted above, the method of the present invention can be utilized to treat a variety of dishwasher components. In this regard, the inventors have discovered that improved drying capabilities can be obtained from treating at least one surface of a dishwasher component. Limiting the area that requires treatment serves to limit costs. To this end, in an embodiment, suitable dishwasher components, such as a silverware basket or a vent screen, can be designed in a multi-piece construction that separates the water containing mesh from the rest of the supporting structure.

FIGS. 2 and 3 illustrate multi-piece dishwasher components that may be utilized in the present invention. FIG. 2 illustrates a silverware basket 26 having top portion 28 and a bottom mesh portion 30. The top portion 28 is untreated; whereas, the bottom mesh portion 30 is chemically treated to render the surface hydrophilic.

In similar fashion, FIG. 3 illustrates a multi-piece screen vent 32. The screen vent 32 has an untreated base portion 34 and a treated mesh portion 36. In such embodiments, the mesh portions (30 and 36) that require improved water-to-surface interaction are treated, then fastened to the untreated supporting structure by snap fit, mechanical fasteners, heat welding, or friction welding.

By way of example and not limitation, experimental results obtained from testing the drying performance of a dishwasher containing treated components will now be set forth.

EXPERIMENTAL EXAMPLE NO. 1

This example demonstrates the results obtained from chemically treating a single dishwasher component with a sulfonation treatment. Tests were conducted to evaluate the drying performance of dishwasher containing treated and untreated vent arrangement. Specifically, a test was run with a treated vent and a test was run with an untreated (control) vent.

A laboratory test procedure designed to evaluate dishwasher performance was used. This procedure is based on a NEMA-proposed standard drying test. Standard equipment was also utilized in these drying tests. Namely, an enclosure for under counter dishwashers, built in accordance with UL specification 749, was used. In addition, a Paasche LF flock air gun was used and AHAM test dishes, glasses, serving pieces and silverware as specified in AHAM DW-1 were utilized.

The testing procedure was as follows. First, the dishwasher was connected to an electric power service and the fill and drain lines were connected. Next, the UL-type enclosure for under counter dishwashers was set up to approximate operating conditions and to minimize the effect of ambient air currents. Then, the dishwasher was loaded to capacity table settings per AHAM DW-1.

An AHAM standard dishwasher detergent was used at 0.25% concentration in water. The machine was started using the normal washing cycle and heated drying. The time that the drying cycle was completed was noted.

An hour after completion of the drying cycle, the dishwasher was opened and the dishes were immediately sprayed with a mixture of two level tablespoons of Nestle's "Quick" and four level tablespoons of Hills Brothers instant coffee until all services of items were coated.

The dishwasher door was then left open for 15 minutes before grading. To avoid spillage of water from wet items onto other items, the items in the lower rack were graded first. Then, any items which were displaced and full of water were carefully removed. A variety of testing parameters were evaluated, the results of which are set forth below.

Table 1 below sets forth the drying score data obtained from the test. Column A of Table 1 illustrates the condition (treated or untreated) of the vent; whereas, column B indicates the untreated condition of the basket. The columns labeled upper, lower, and silver refer to the scoring of the items in the upper dishwasher rack, the lower dishwasher rack, and the silverware baskets. A dishwasher with a 4-fill cycle and a silverware basket placed on the lower rack was utilized for this testing.

FIG. 4 graphically illustrates the drying performance results obtained from this comparative testing conducted on the screen treated with this sulfonation treatment. One treatment was run for each two column test set forth on the graph. The testing was utilized to determine the effect of sulfonation treatment without the use of a rinse agent.

TABLE 1

| Test Run | A VENT | B BSKT | Test Scores | | | |
| --- | --- | --- | --- | --- | --- | --- |
| | | | Upper | Lower | Silver | TOTAL |
| 1 | T | UT | 100 | 100 | 98.4 | 99.2 |
| 1 | UT | UT | 100 | 97.4 | 39.6 | 71.7 |

These results demonstrate that dish load drying can be significantly improved in current dishwashers with chemical treatment of the screen vent. The testing has shown that sulfonation treatment results in faster and more complete draining of the water from the screen. The faster and more complete draining of the vent screen, as demonstrated above, improves the dishwasher drying performance. Thus, a sulfonated vent screen represents a way to alter the water-to-surface interaction and improve dishwasher drying without the use of a rinse agent.

Similar to the screen vent, testing was also conducted on a silverware basket. Such testing demonstrated that faster and more complete draining was also found in the bottom of the silverware basket. Thus, treatment of a silverware basket can likewise prove to be an effective way to improve dishwasher drying without the use of a rinse agent.

EXPERIMENTAL EXAMPLE NO. 2

This example demonstrates the results obtained from chemically treating two dishwasher components with a gas plasma treatment. Tests were conducted to evaluate the drying performance of dishwashers containing treated and untreated vent screens and silverware baskets.

Twelve tests were conducted using various combinations of gas plasma treated and untreated (control) vent screens and silverware baskets. The tests were run in random order using a single dishwasher for all tests. Treated and untreated vents and baskets were put in a single dishwasher to reduce or eliminate any variation that would have resulted from using multiple dishwashers for the testing. A dishwasher with a 4-fill cycle and a silverware basket attached to the interior of the door was utilized for this testing.

A similar testing procedure as outlined in Experimental Example No. 1 was also utilized for this experiment. The procedure is based on a NEMA proposed standard drying test.

Table 2 below sets forth the drying score data obtained from the twelve tests. Column A of the table illustrates the condition (treated or untreated) of the vent; whereas, Column B illustrates the condition of the basket. The columns labeled upper, lower, and silver refer to scoring of the items in the upper dishwasher rack, the lower dishwasher rack, and the silverware basket. Table 3 sets forth the average drying score data for the various tests conducted.

TABLE 2

| Test Run | A VENT | B BSKT | Upper | Lower | Silver | TOTAL |
|---|---|---|---|---|---|---|
| 1 | UT | UT | 100 | 100 | 19.1 | 63.1 |
| 2 | T | UT | 100 | 100 | 82.6 | 92.1 |
| 3 | UT | T | 100 | 100 | 39.7 | 72.5 |
| 4 | T | T | 100 | 100 | 98.5 | 99.3 |
| 5 | T | T | 100 | 100 | 98.5 | 99.3 |
| 6 | UT | UT | 100 | 100 | 15.9 | 61.6 |
| 7 | UT | T | 100 | 100 | 33.4 | 69.6 |
| 8 | T | T | 100 | 100 | 98.5 | 99.3 |
| 9 | UT | UT | 100 | 100 | 19.1 | 63.1 |
| 10 | UT | T | 100 | 100 | 15.9 | 61.6 |
| 11 | T | UT | 100 | 100 | 96.9 | 98.6 |
| 12 | T | UT | 100 | 100 | 85.8 | 93.5 |

TABLE 3

| | Silverware Score | Total Score |
|---|---|---|
| Production vent and basket (control) | 18.0 | 62.6 |
| Treated basket only | 29.7 | 67.9 |
| Treated vent only | 91.0 | 94.7 |
| Treated vent and basket | 98.5 | 99.3 |

Figure 5:
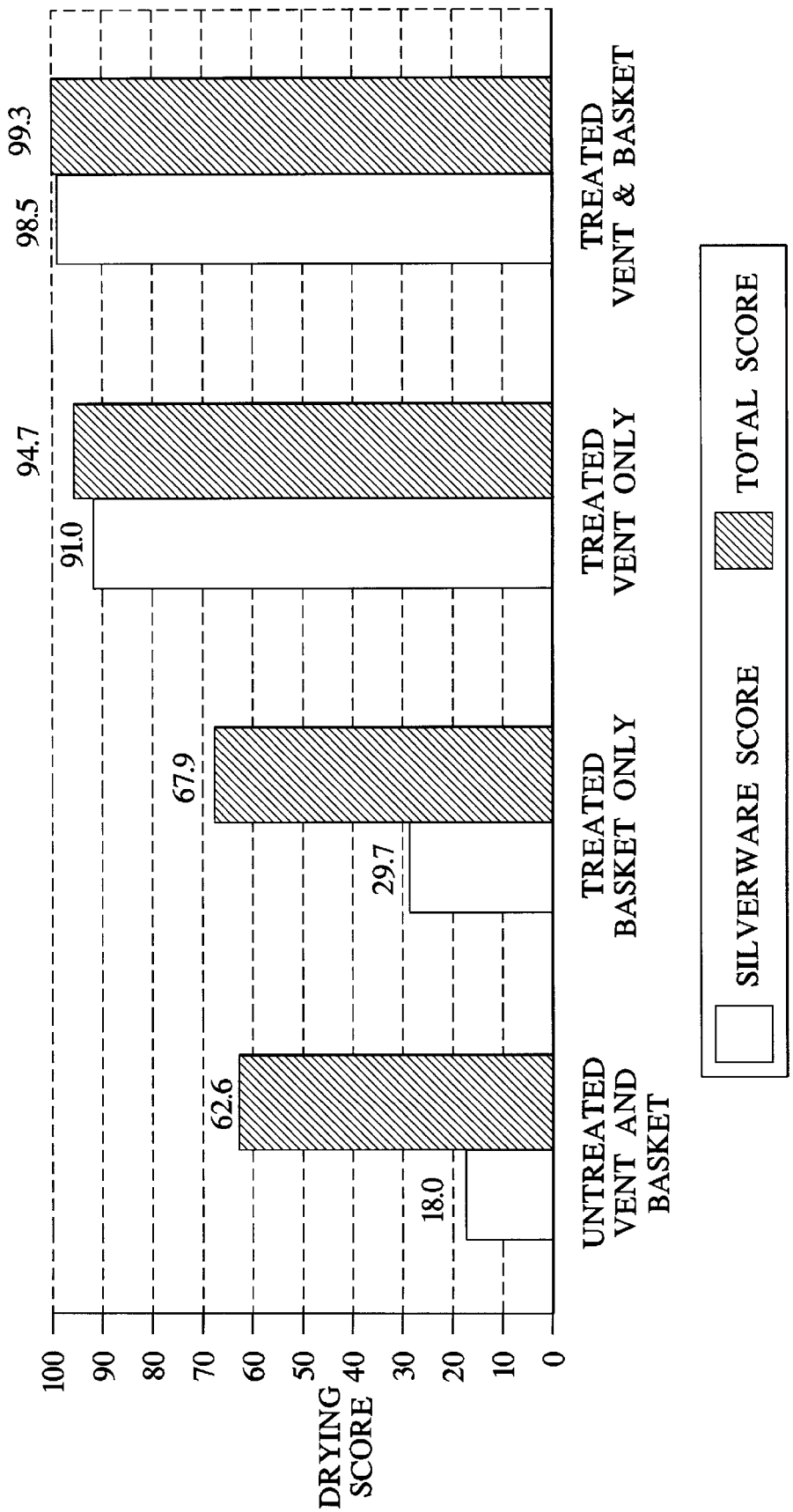
FIG. 5 graphically illustrates the drying performance results obtained from comparative testing conducted on dishwasher components treated with a gas plasma treatment.

FIG. 5 graphically illustrates the drying performance results obtained from this comparative testing conducted on the screen vents and the silverware baskets treated with this gas plasma treatment. This testing was utilized to determine the effect of a gas plasma treatment without the use of a rinse agent. In this experiment, data from a set of three tests was averaged to obtain both a silverware score and a total score. The resulting average silverware drying score is depicted by a column in FIG. 5, and the resulting average total drying score is shown as an adjacent column. Thus, in this graph, adjacent columns are derived from the same test data.

These results demonstrate that dish load drying can be significantly improved in current dishwashers with chemical treatment of the screen vent. Dish load drying was also found to be improved with treatment of the silverware basket, but to a lesser extent.

It should be understood that we wish to embody within the scope of the patent warranted hereon, all such modifications as reasonably and properly come within the scope of our contribution to the art.

The embodiments of the invention in which an exclusive property or privilege is claimed are therefore defined as follows:

1. A method for improving drying performance of a dishwasher comprising the step of chemically treating a polymeric dishwasher component with a gas plasma treatment or a sulfonation treatment to render at least one surface of the polymeric dishwasher component hydrophilic.

2. The method of claim 1 wherein the dishwasher component is selected from the group consisting of: a screen vent; a silverware basket; a dishwasher tub and a door lining.

3. The method of claim 1 wherein the gas plasma treatment is an oxygen gas plasma treatment.

4. An apparatus with improved drying capabilities comprising:

a dishwasher having a plurality of dishwasher components, at least one dishwasher component having a hydrophilic polymeric surface capable of attracting water molecules, the component being fabricated by molding the component into a desired shape and thereafter treating the component using a gas plasma treatment or a sulfonation treatment to render the outer surface of the component hydrophilic.

5. The apparatus of claim 4 wherein the dishwasher component is selected from the group consisting of: a screen vent; silverware basket; a dishwasher tub; and a door lining.

6. The apparatus of claim 4 wherein the g as plasma treatment is an oxygen gas plasma treatment.

7. A method for making a dishwasher component with enhanced drying performance comprising:

molding polymeric materials into a dishwasher component; and chemically treating the dishwasher component using a gas plasma treatment or a sulfonation treatment to render at least one surface of the component hydrophilic.

8. The method of claim 7 wherein the dishwasher component is selected from the group consisting of: screen vent; silverware basket; a dishwasher tub; and a door lining.

9. The method of claim 7 wherein the gas plasma treatment is a oxygen gas plasma treatment.

* * * * *